Oct. 6, 1931.  B. F. FITCH  1,825,787
APPARATUS FOR TRANSFERRING FREIGHT
Filed Oct. 27, 1928   2 Sheets-Sheet 1
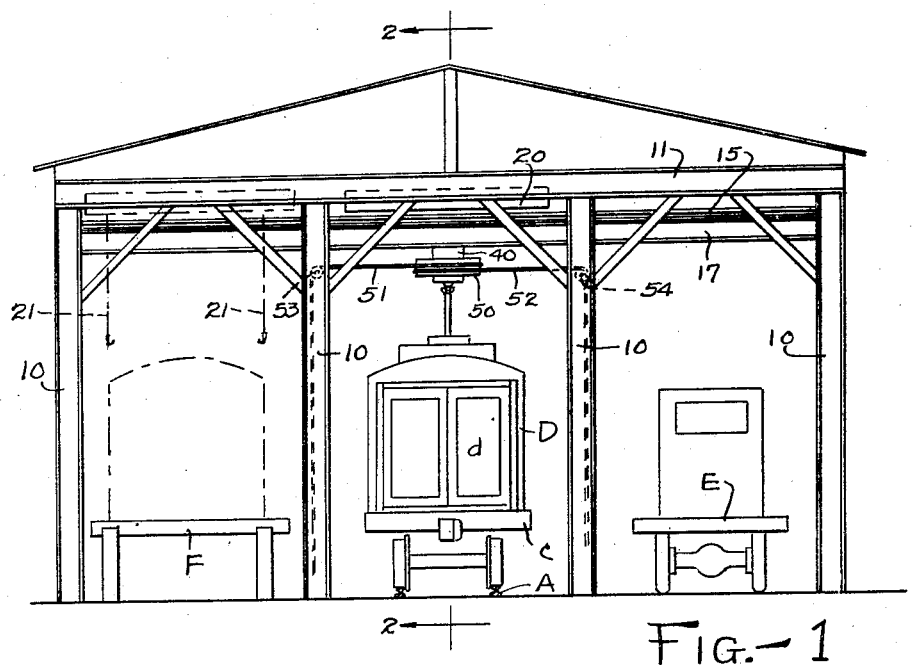
Fig.—1
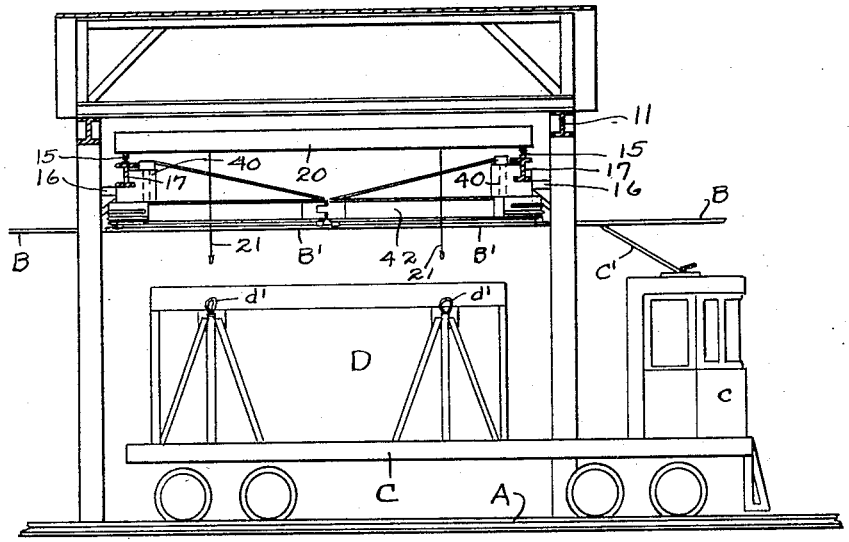
Fig.—2
Inventor
Benjamin F. Fitch
By Bates, Goldrick & Teare
Attorneys Oct. 6, 1931.  B. F. FITCH  1,825,787
APPARATUS FOR TRANSFERRING FREIGHT
Filed Oct. 27, 1928  2 Sheets-Sheet 2
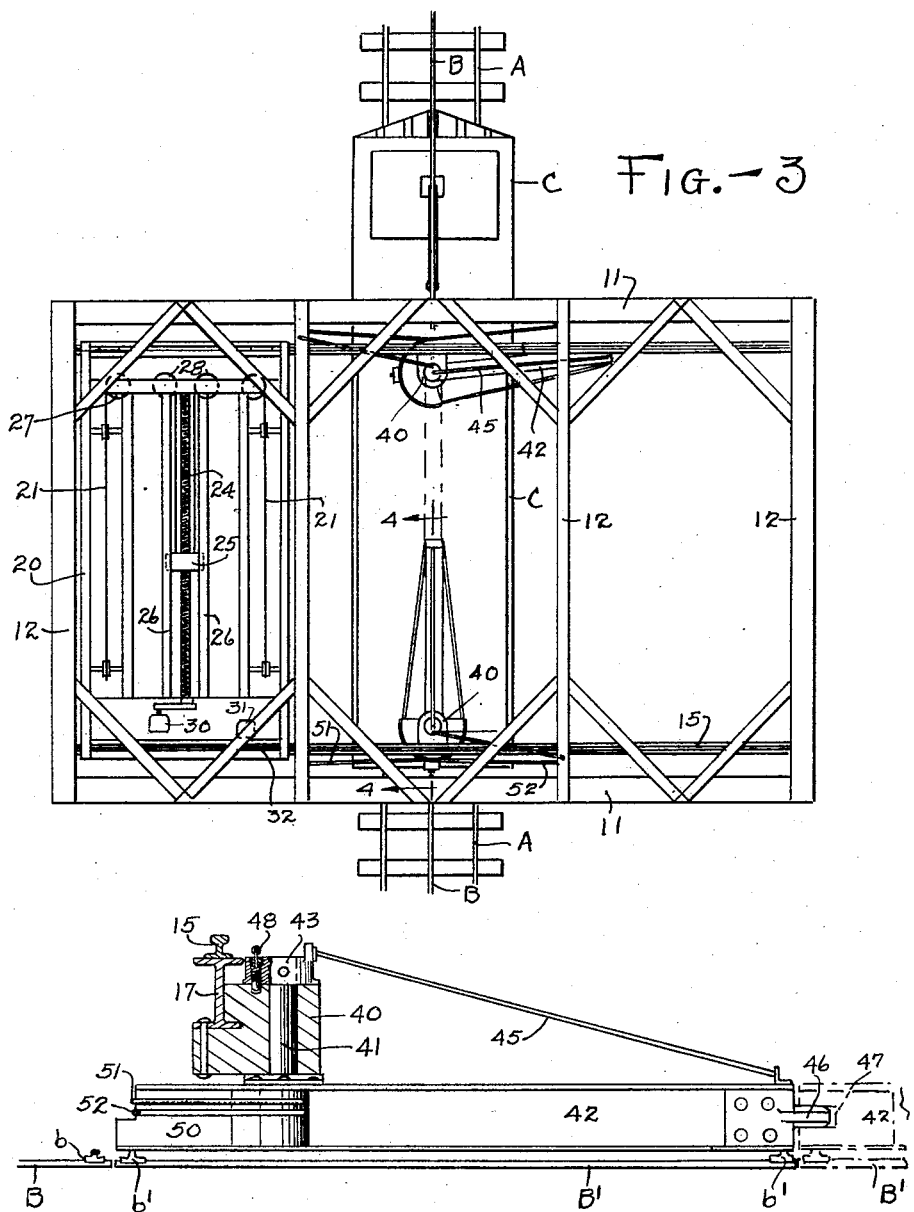
Inventor
Benjamin F. Fitch,
By Bakis, Golrick Stern
Attorneys Patented Oct. 6, 1931

1,825,787

UNITED STATES PATENT OFFICE

BENJAMIN F. FITCH, OF GREENWICH, CONNECTICUT, ASSIGNOR TO MOTOR TERMINALS COMPANY, OF WILMINGTON, DELAWARE, A CORPORATION OF DELAWARE

APPARATUS FOR TRANSFERRING FREIGHT

Application filed October 27, 1928. Serial No. 315,450.

This invention relates to a freight handling apparatus associated with an electric railway having an overhead trolley wire. Removable containers are provided which are adapted to be transported by the electric car to a transfer point and thereafter another loaded container deposited on the car. The latter container may for instance be brought to the transfer point by a motor truck, which will carry away another container. As such containers to be efficient must be of considerable size, hoisting and transporting mechanism is essential in removing or replacing the loaded container. It is an object of this invention to provide such hoisting and transporting mechanism in a very simple and efficient form, suitable for installation at comparatively small expense, associated with means for moving the trolley wire out of the way of the crane cables suspending the container, so that the crane may transport the body laterally.

More particularly, I propose in this invention to so mount that portion of the trolley wire which is at the transfer point that it may be readily swung out of the way of the crane cables, that is to say, I provide a section which is hingedly mounted adjacent an end of the trolley wire proper, and may continue the line of that wire or may be swung in an angle thereto. Preferably there are two of these sections, the hinge axes being adjacent the ends of the crane superstructure and the two sections being adapted to meet at the center of such structure and so meeting, the sections make a continuation of the trolley wire; when swung laterally at right angles to the trolley wire, they leave an open path for the shifting of the crane cables. Such an apparatus is illustrated in the drawings hereof, and is hereinafter more fully explained. The essential novel feartures of the invention are summarized in the claims.

In the drawings, Fig. 1 is an elevation transversely of an electric railway track and two side superstructures, and an overhead crane trackway; Fig. 2 is a sectional elevation thereof at right angles to Fig. 1, being on a plane indicated by the line 2—2 on Fig. 1; Fig. 3 is a plan of such installation, the roof being omitted; Fig. 4 is a sectional elevation illustrating the pivoted support for one of the trolley wire sections.

As shown in Figs. 1, 2, 3, A represents an electric railway track, B the usual suspended trolley wire therefor, and C an electric flat car adapted to travel on such rails by electric power. This flat car may have a cab $c$ and a trolley pole $c'$. D indicates the removable body, which may be mounted on the flat car in the rear of the cab. This body is preferably of such size that it may also readily fit on an automobile truck (as indicated at E in Fig. 1) so that the body may be interchanged as desired between the truck and flat car. The body may be provided with suitable doors $d$, and at the eves with hooks or eyes $d'$ or other means for attachment of raising cables.

In Figs. 1, 2 and 3, I have shown superstructures located opposite each other on both sides of the track and connected by a bridge, thus providing a continuous overhead support for the crane as well as means for carrying the substitute for the trolley wire to be presently described. Such superstructure has upright posts 10, suitable cross beams 11 and tie members 12. It carries crane tracks 15 resting on beams 17 bridging across the railway track space. These beams are shown as mounted on brackets 16 carried by the posts 10.

The tracks 15 carry a suitable crane 20 having four raising cables 21 terminating at their lower ends in hooks or eyes. Mounted on the crane frame is a suitable mechanism for pulling up these cables as a unit. The mechanism shown comprises a rotatable screw 24 (Fig. 3), a travel nut 25 thereon, and guide bars 26 for the nut. The cables 21 pass from the load upwardly over four sheaves and thence around sheaves 27 and 28, and are finally anchored to the nut 25. Accordingly, the rotation of the screw operates to simultaneously raise or lower all four of the lift hooks. The screw may be rotated by any suitable means, as for instance an electric motor 30, which may receive its power from the trolley circuit. The crane preferably has also a motor 31 geared with one of the supporting wheels 32, whereby the crane may be shifted along its track.

Normally the raising cables and lift hooks are located a considerable distance above the line of the trolley wire B and entirely out of the way of the electric car and the trolley pole. Accordingly, the car may run freely past the transfer structure. It is desirable however, that the trolley wire be normally continued through the structure either in the form of the wire, a bar or other wheel guide, so that the car may run continuously without attention to the trolley pole, when the hoist mechanism is not in use.

However, to use the hoist mechanism to raise a body and shift it laterally to or from the car, it is necessary to provide some means whereby the trolley wire will not interfere with the supporting cables. To accomplish this, I terminate the trolley wire proper adjacent the two ends of the superstructure, and support the free ends by suitable transverse wires or brackets indicated at $b$ in Fig. 4, and I mount two normally aligned intermediate sections of the trolley wire on two swinging supports which may be located directly over the railroad track or may be swung laterally to carry the intermediate sections to idle position, leaving an open gap for operation of the raising cables. Such construction will now be described.

I secure to each of the transverse beams 17 of the superstructure a block 40 in which is journalled a vertical shaft 41, carrying at its lower end a cantilevered beam 42. The shaft may have a suitable collar 43 at its upper end, resting on the block, and the extreme end of the cantilevered beam may be trussed to this collar by a tie rod 45. Each of the two beams 42 carries on its underside a trolley wire section designated B'. This may consist of a wire supported by insulators $b'$ or otherwise carried by the beam 42. If insulated, these sections may receive current from the trolley circuit. In normal position, the beams 42 stand parallel with the railroad track, thus keeping the trolley wire sections B' in alignment with the main trolley wire B. Preferably, one of the sections 42 has a tongue 46, which is adapted to occupy an opening 42 in the other section, so that the beams may be accurately aligned when in active position. The tongue and recess may be wedge-shaped to secure perfect alignment vertically. I prefer to provide a suitable lock to hold the beams in their active position. Such a lock is indicated in Fig. 4 as a bolt 48 carried by the collar 43, and adapted to be pressed by a spring into a recess in the block 40 when the beam 42 is longitudinal of the track.

I provide simple means for swinging the beams 42 from their normal position into a position at right angles thereto, to clear the way for the travel of the hoist cables. The means shown comprises a substantially semi-circular block 50 coaxial with the shaft 41, rigid with the beam 42, and a pair of cables 51 and 52 anchored respectively to opposite ends of the diameter of said block, passing around the curve of the block in opposite directions, and thence downwardly over sheaves 53, 54 carried by a pair of superstructure beams 10.

Normally the beams 42 carrying the intermediate trolley wire are locked in the active longitudinal position and the electric car may operate in the ordinary manner without regard to the transfer mechanism. When however, it is desired to use the crane, it is only necessary to pull up on the locks 48 by suitable cords not shown, and then pull on the proper cable 51 or 52 to swing the beams 42 into position at right angles to the railroad track, after which the crane may operate freely through the space above the railroad track.

Suppose it is desired to transfer a loaded container D from an electric freight car C to a truck E standing alongside of the car at the transfer point as in Fig. 1. After the trolley car has arrived at the transfer position, and the intermediate wire supports have been swung laterally, the hoist is trolleyed by its motor 31 directly over the flat car, the cables are lowered, attached to the body, the body is then raised by the operation of the motor 30 and then transported laterally by the motor 31, and thereafter lowered by the reverse operation of the motor 30 onto the truck E. Both these motors may receive their current from the trolley wire circuit. In place of depositing the body on a motor car, it may of course be deposited on suitable temporary supports as for instance "horses" F on the other side of the double superstructure of Fig. 1. A reverse operation from that described to transfer a body from the support or truck to the electric flat car where it may be transported.

I claim:—

1. In an apparatus for transferring freight, the combination of a superstructure, a traveling crane mounted thereon and having depending raising cables adapted to engage and lift a removable body from a vehicle, a pair of members pivotally carried by the superstructure and adapted to stand in alignment with their free ends adjacent or be turned out of alignment, and trolley wheel guides carried by said pivotally mounted members, the cables of the traveling crane being adapted to pass through the normal position of the trolley wheel guides.

2. In an apparatus for transferring freight, the combination of a railway track, of a supporting structure alongside of the track, said structure extending over the track, two horizontal members pivoted on vertical axes to said superstructure, which axes are located above the railroad track, said members being adapted to stand in longitudinal alignment or be turned transversely, trolley wheel guides carried on the underside of said members, means for swinging such members, and a traveling crane mounted on the superstructure and having a depending elevating member adapted to move across the position occupied by the trolley wheel guides when they are in alignment.

3. In an apparatus for transferring freight to or from electric lines, the combination with a railway track and a trolley wire above it, of a supporting structure located alongside of the track and extending over the track, two cantilevered members mounted on vertical axes adjacent opposite ends of the structure respectively, means for swinging said members to bring them into longitudinal alignment or to turn them laterally out of the way, trolley wheel guides mounted on the underside of said members and adapted when the members are in alignment to register with the main trolley wire, and a traveling crane mounted above said swingable members, and having four depending raising cables adapted to engage a removable body on an electric car adjacent the superstructure, the cables of the traveling crane being adapted to pass through the normal position of the trolley wheel guides.

4. In an apparatus for transferring freight, the combination of a railway track, a pair of supporting structures opposite each other on opposite sides of the track, said structures having a bridge extending across the track, a traveling crane on said bridge adapted to stand on the track or on either side thereof, there being a vehicle runway on at least one side of such track over which the crane may stand, a pair of members hinged to opposite ends of the bridge portion of the superstructure, trolley wheel guides carried by said members adapted to be brought in alignment with each other and with their free ends adjacent, or to be turned laterally, and a cable depending from said crane and adapted to pass through the normal position of the trolley wheel guides.

5. In an apparatus for transferring freight to or from electric lines, the combination with an electric railway having a track and a trolley wire above it, upright posts on opposite sides of the track, a bridge carried by said posts extending over the track and to either side thereof, a traveling crane mounted on said bridge, adapted to stand over the track or over a working space on either side thereof, a vehicle runway in at least one of such open spaces, said crane having four depending cables adapted to engage a removable body and having means for raising said cables as a unit, two swingable trolley wheel guide sections mounted on the bridge portion of the structure and adapted to stand in alignment with each other and align with the main trolley wire, and means for swinging said sections laterally to provide an open space through which the four cables of the hoist may travel.

6. In an apparatus for transferring freight to or from electric cars, the combination with a superstructure and a hoist carried thereby, and having a depending cable, of a movable trolley wheel guide adapted to align with the trolley wire, and means for swinging said guide laterally in a horizontal plane, said cable being adapted to pass through the normal position of the trolley wheel guide.

7. In an apparatus for transferring freight to or from electric cars, the combination of a railway track, a trolley wire above it, a superstructure adjacent the railway track, a member mounted therein above the plane of the trolley wire swingable laterally in a horizontal plane, a trolley wheel guide carried on the underside of said laterally swingable member, and depending mechanism accessible from below the trolley wheel guide for swinging said guide laterally.

8. In an apparatus for transferring freight, the combination of a superstructure, a traveling crane carried thereby and having a depending cable, and two swingable trolley wheel guides carried by the superstructure and adapted to stand in alignment with their free ends adjacent or to be swung laterally to clear a space for the depending member of the traveling crane, said cable being adapted to pass through the former position of the trolley wheel guides.

In testimony whereof, I hereunto affix my signature.

BENJAMIN F. FITCH.